US006848393B2

(12) United States Patent
Debonne

(10) Patent No.: US 6,848,393 B2
(45) Date of Patent: Feb. 1, 2005

(54) DRINKING SYSTEM FOR PROVIDING DRINKING LIQUID TO POULTRY

(75) Inventor: Christophe Roger Antoon Debonne, Oostkamp (BE)

(73) Assignee: Roxell, N.V. (BE)

( * ) Notice: Subject to any disclaimer, the term of this patent is extended or adjusted under 35 U.S.C. 154(b) by 0 days.

(21) Appl. No.: 10/332,543

(22) PCT Filed: Jul. 5, 2001

(86) PCT No.: PCT/IB01/01196

§ 371 (c)(1),
(2), (4) Date: Jun. 2, 2003

(87) PCT Pub. No.: WO02/03784

PCT Pub. Date: Jan. 17, 2002

(65) Prior Publication Data

US 2004/0025799 A1 Feb. 12, 2004

(51) Int. Cl.[7] .......... A01K 39/02
(52) U.S. Cl. .......... 119/75
(58) Field of Search .......... 119/74, 75, 72, 119/78

(56) References Cited

U.S. PATENT DOCUMENTS 648,922 A * 5/1900 Chace .......... 119/78
1,646,246 A * 10/1927 Hazard .......... 119/75
2,654,346 A * 10/1953 Goff .......... 119/81
2,749,882 A * 6/1956 Butker .......... 119/74
3,086,500 A * 4/1963 Spire .......... 119/74
3,195,412 A 7/1965 Jackson
3,428,028 A 2/1969 Hart
3,868,926 A * 3/1975 Olde .......... 119/75
3,946,703 A * 3/1976 Wheat .......... 119/75
3,964,440 A 6/1976 Hart
4,047,503 A 9/1977 Wilmot
4,157,697 A * 6/1979 Neher .......... 119/75
4,221,188 A * 9/1980 Hostetler .......... 119/72
5,339,768 A * 8/1994 Schumacher .......... 119/72
5,456,210 A * 10/1995 Miller .......... 119/75

FOREIGN PATENT DOCUMENTS

EP 0 992 188 4/2000

OTHER PUBLICATIONS

European Search Report dated 18 Jul;y 2003 for application No. EP 01 94 5554.

* cited by examiner

*Primary Examiner*—Robert P. Swiatek
(74) *Attorney, Agent, or Firm*—Todd Deveau; Thomas, Kayden, Horstemeyer & Risley LLP

(57) ABSTRACT

Described is a water distribution system (1) with a continuous main line (10). Drinking cups (20) are placed on drinking segments (11) of the main line (10). Between the drinking segments (11) the main line (10) has intermediate segments (13), which are situated at a higher level than the drinking segments (11). The drinking cups are situated at a level suitable for drinking, and the intermediate segments are situated at a level suitable for allowing the birds to pass through unhindered underneath them. The complete line system can be cleaned by means of flushing, and has no dead-end branches. Top edges (22) of the drinking cups (20) are advantageously fixed to vertically directed line segments (13).

The water distribution system (1) is modular. The drinking cups (20) are mounted in an exchangeable manner and can be replaced individually by another specimen, if desired with different features, without it being necessary to remove the valves and shut off the water line, and thus put the system out of operation.

14 Claims, 6 Drawing Sheets

DRINKING SYSTEM FOR PROVIDING DRINKING LIQUID TO POULTRY

CROSS-REFERENCE TO RELATED APPLICATIONS AND CLAIM OF PRIORITY

This is a U.S. National Phase application of PCT/IB01/01196 filed on 5 Jul. 2001, which PCT application claims priority to NL application number 1015680, filed 11 Jul. 2000.

FIELD OF THE INVENTION

The present invention relates in general to the field of breeding poultry, such as, for example, meat-producing poultry, chickens, turkeys, ducks, etc. A feed distribution system is then provided, in order to provide the birds with feed, and a liquid distribution system is provided, in order to provide the birds with drinking liquid. In general, said liquid will consist of water, although additives may be placed in it. The liquid will simply be described as water below.

BACKGROUND OF THE OF INVENTION

Such water distribution systems have to meet various standards. First, it must, of course, be easily possible for the birds to obtain sufficient water. On the other hand, the system must be hygienic. There must be as little spillage of water as possible, since it is desirable for the litter used as a floor covering to remain as dry as possible. Moreover, the system should hinder the birds as little as possible, and the system should necessitate the fewest possible human actions for good functioning.

A number of water distribution systems are known in this field, and can be divided into various categories. A first category relates to the so-called bell-drinkers. In the case of such a system, which was developed particularly for turkeys, a number of drinking points are disposed around a central element, which is fed by means of a vertical supply line. A second category relates to a distribution system with long liquid lines, extending substantially over the entire length or breadth of a poultry house, each liquid line being provided with drinking points at regular intervals. The present invention relates to a water distribution system of this second category.

Various variants of embodiments have already been developed within this second category, each with their own advantages, but also shortcomings. In the case of a first variant each liquid line is in the form of a straight pipe, which is suspended at some distance above the floor and provided with drinking nipples on its underside. The height of the pipe relative to the floor is adjustable; as the birds grow, the height will be increased. The drinking nipples release a drop of water when they are touched. The idea is for a bird to drink the drops from such a nipple with its beak, the birds constantly knocking against the nipple, and new drops constantly being supplied.

A disadvantage here is that the drinking nipples are suspended rather high up for the birds, because the height of the straight pipe will be set in such a way that the birds can pass through virtually unhindered underneath the pipe. However, a bird wanting to drink then has to direct its beak upwards, which is an unnatural posture for the birds.

A further disadvantage is that the drinking nipples make the water available only in the form of a drop, and that a bird wanting to drink has to find a way of taking that drop from the nipple with its beak, which again is unnatural. In a natural way of drinking, a bird scoops water out of a water bath with its beak, in which case the water surface is situated at a lower level than its head.

It is a further disadvantage that the drinking nipples make only a small quantity of water available. The result is that it takes quite a long time before a bird has drunk a desired quantity of water. In addition, the drinking nipples are not suitable for providing several birds with adequate water simultaneously.

Furthermore, it is a disadvantage in the case of this system that quite a large quantity of water is lost in the form of drops falling onto the floor (spillage). In addition, the nipples also have to have drops when birds do not knock against the nipples, in order to let the birds see how they can come by drinking water; in other words, the nipples have to have a slight degree of leakage, so that drops also fall onto the floor when the birds are not drinking. The drops falling onto the floor lead to a damp patch in the floor covering below each drinking nipple. Such a damp patch gives rise to a risk of bacterial, viral and fungal infections. Moreover, droppings falling into such a damp patch will produce an increased emission of ammonia gas in the poultry house.

In order to counteract the problem of spillage, it is known to fit a drop collection tray below each nipple, which tray is fixed by means of a bracket to the liquid line. Although the spillage of water onto the floor is reduced by this, the drop collection tray is also a potential collection point for dust, dirt and microorganisms. Besides, the drop collection tray can hinder the birds when they are approaching the nipple.

A further drawback of this known variant is that the maximum output that can be supplied per nipple is relatively low, of the order of 0.1 litre/min. This is due to the fact that the pressure prevailing in the water line is relatively low, of the order of 30 cm rated water pressure, maximum approximately 50 cm water pressure.

In the case of a second variant there is also a horizontal main pipe, suspended at a distance above the floor, the height of suspension being variable. At each water-dispensing point, a branch line, running substantially in an L-shape, is connected to the horizontal main pipe. More particularly, such a branch line has a vertical pipe segment that is connected by its top end to the horizontal main pipe, and at its bottom end merges into a horizontal pipe segment. A drinking cup is placed at the free end of said horizontal pipe segment, on its top side. This variant has a number of important disadvantages.

The horizontal pipe segment generally runs parallel to the main pipe, so that the drinking cup is situated below the main pipe. This means that the headroom for the birds, i.e. the clear height above the drinking cups, is limited to the vertical distance between the drinking cups and the horizontal main line.

Another major disadvantage of this variant is the fact that the L-shaped branch line is difficult to clean. It is generally desirable for the water pipes to be flushed regularly. Various reasons can be given for this. First, it may be desirable, as already mentioned above, to place additives, such as medicines, in the water. On account of the low flow rate of the water in the lines, such additives can lead to deposits. It is further the case that bacteria and algae can grow in virtually stagnant water.

The horizontal main pipe is generally connected at one end to a water supply system, such as the water mains or a pump. The horizontal main pipe is shut off at its other end. The flushing is carried out by opening the shut-off valve at said other end of the horizontal main pipe, and possibly increasing the water pressure at the inlet of the horizontal main pipe, with the result that water flows at relatively great speed through the horizontal main pipe. However, the branch lines cannot be flushed in this way, because they are dead-end branches. It is possible per se to design the branch lines in such a way that they can be flushed, namely by placing a valve which can be shut off at the free end of the horizontal pipe segment of a branch line, beyond the drinking cup. In normal circumstances said valve is then closed; said valve is opened when the branch line is to be flushed. All said valves would, however, make the system relatively expensive. Moreover, it will be clear that opening and closing of all these valves is extremely labour-intensive.

A water distribution system according to the preamble of claim 1 is known from U.S. Pat. No. 4,341,182, in which FIG. 1 shows a main pipe extending in the horizontal direction with drinking cups fitted on top of it. At a slight distance above the drinking cups there is a suspension system for height-adjustable suspension of the main pipe. The suspension system here comprises a push rod extending in the horizontal direction and a pulling cable which is fitted above it and serves to prevent poultry from perching on the push rod.

A disadvantage of the water distribution system from U.S. Pat. No. 4,341,182 is that the headroom for the birds, i.e. the free height above the drinking cups, is limited to the vertical distance between the drinking cups and the horizontal main pipe. Another major disadvantage is that the birds are prevented by the horizontal main pipe from being able to pass through underneath the pipe.

The present invention aims to provide a new variant for such a water distribution system, in which the abovementioned drawbacks of earlier systems are eliminated, or at any rate considerably reduced.

More particularly, the present invention aims to provide a water distribution system that is multifunctional, in other words usable for different types of poultry, such as meat-producing poultry, ducks, turkeys, chickens, parent birds and laying hens, and is thereby suitable for providing birds with fresh drinking water from the first day (day-old chicks) up to the adult stage.

It is a further aim of the present invention to provide an improved water distribution system that has a high capacity.

It is a further aim of the present invention to provide an improved water distribution system that does not have any dead-end zones where water can remain stagnant for a long time thus enabling algae and bacteria to grow there, but a system which can be fully cleaned by flushing. More particularly, the present invention aims to provide a water distribution system which is free from dead-end branches.

SUMMARY OF THE INVENTION

In order to achieve the abovementioned aims, the main line of an improved water distribution system according to the present invention is in the form of a continuous, generally horizontally extending pipe, which is curved in the vertical direction and thereby comprises pipe segments situated higher up and pipe segments situated lower down. Drinking cups are placed on the top side of the pipe segments situated lower down. The pipe will be suspended at such a height that the height of the drinking cups is adapted to the size of the birds. The birds can pass unhindered between water-dispensing points, underneath the pipe segments higher up. The drinking cups are placed directly on the pipe itself, so that there are no dead-end branch lines between the pipe and the drinking cups. There is no line above the drinking cups, so that the headroom above the drinking cups is not restricted by the line.

The improved water distribution system according to the present invention is further of modular construction, by which is meant that the drinking cups are fitted in an exchangeable manner and can be replaced individually by another specimen with or without different features, without it being necessary to shut off the water line, and thus put the system out of operation. More particularly, each individual drinking cup can be replaced by, for example, a drinking cup with a different cup width and/or different cup height.

These and other aspects, features and advantages of the present invention will be explained in greater detail by the description which follows of a preferred embodiment of a water distribution system according to the invention with reference to the drawing, in which the same reference numerals indicate the same or comparable parts, and in which:

DETAILED DESCRIPTION OF THE INVENTION

Figure 1:
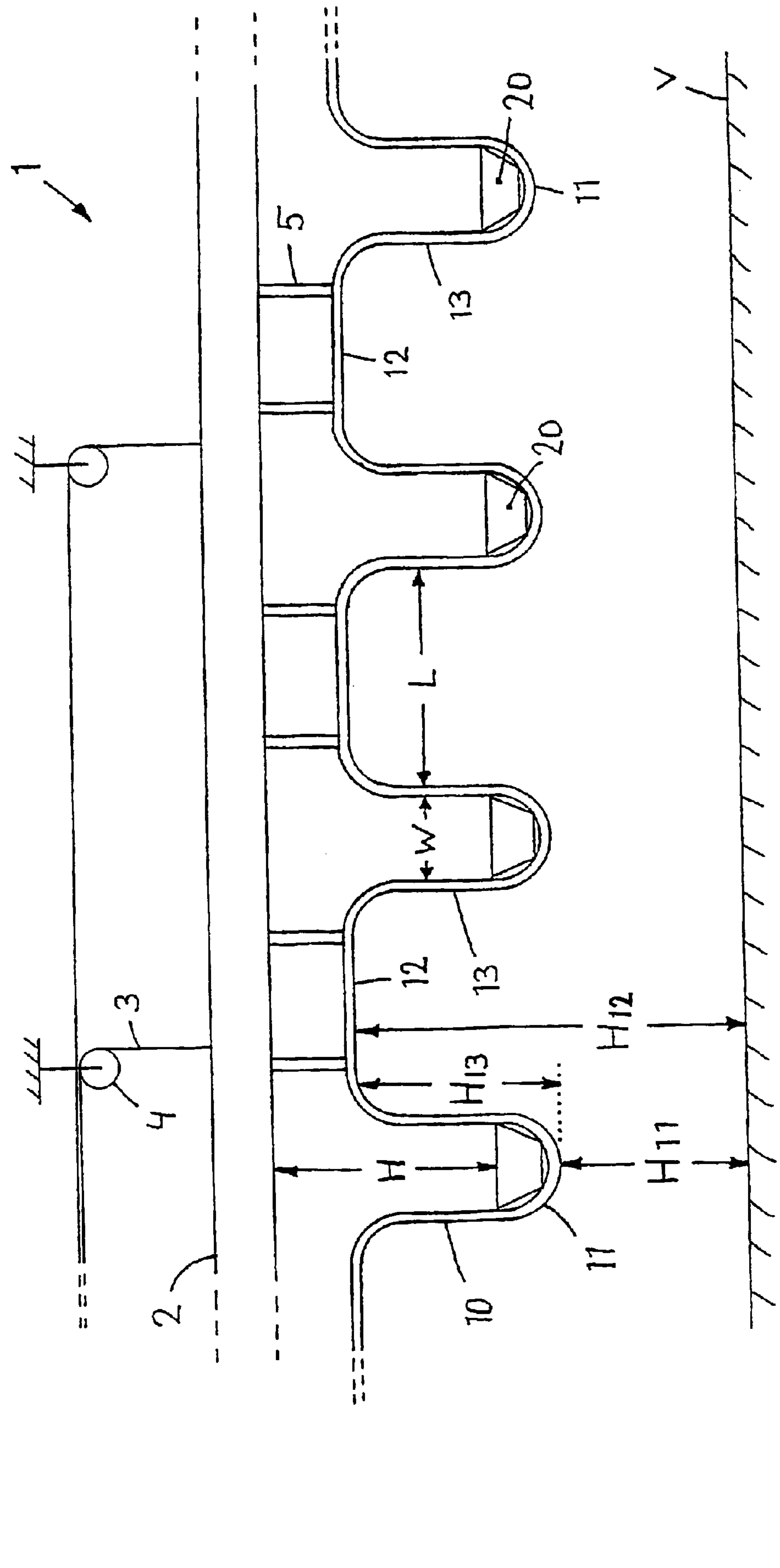
FIG. 1 shows diagrammatically a side view of a part of a water distribution system according to the present invention.

FIG. 1 shows diagrammatically a side view of a part of a water distribution system 1 according to the present invention. The water distribution system 1 comprises a main line 10, which is suitable for conducting water. The main line 10 can be in the form of a pipe of a suitable material, for example plastic with a suitable profile, for example round or square. The main line 10 is designed to be fitted above the floor V of a poultry house, in such a way that the height is variable relative to the floor.

In the embodiment shown, the water distribution system 1 comprises a horizontal bearing rail or longitudinal section 2, the cross section of which can have a suitable contour, for example the contour of a three-point star. The bearing rail 2 can, however, also be made of, for example a tube with a round or square cross section. The shape of the cross section of the bearing rail 2 is not, however, shown separately in the figure. The bearing rail 2 is suspended by means of a winch system comprising cables 3 and cable pulleys 4, suspended from a ceiling (not shown) of the abovementioned poultry house. The height of the bearing rail 2 can be varied by means of said winch system, as will be clear to a person skilled in the art.

The main line 10 is fixed to the bearing rail 2 by means of mounting brackets or mounting cables 5. As an alternative, it would be possible for the main line 10 to be suspended directly from the winch system, without the interposition of a bearing rail 2, but the use of a bearing rail has the advantage, inter alia, that the system is more robust, while the main line can still be of a relatively light design, and is therefore relatively cheap to produce.

The main line 10 is subdivided into successive segments 11, 12, 13. The segments 11, 12, 13 are disposed in series with each other with respect to a water flow, and thus define the long continuous main line 10. The segments 11, 12, 13 are not, however, placed physically in line with each other. More particularly, the segments are placed at heights differing from each other.

The water distribution system 1 also comprises drinking cups 20, which are fitted directly on the top side of the main line 10. As will be explained in greater detail later, the drinking cups 20 can be filled with water from the inside of the main line 10. The drinking cups 20 can be drinking cups which are known per se.

The drinking cups 20 are of such a design and are situated at such a height that poultry can drink from them easily and in a natural way. In what follows, segments of the main line 10 on which drinking cups 20 are fitted will be indicated by the term "drinking segments" 11. The height H11 of the drinking segments 11 relative to the floor V will also be indicated below by the term "drinking height". Said drinking height H11 is adapted, by means of the abovementioned winch system, to the type of birds for which the system concerned is intended.

The birds can walk unhindered around the drinking cups 20. For this purpose, the main line 10 has segments between the successive drinking segments 11, which will be indicated below by the term "intermediate segments" 12. As can be seen clearly from FIG. 1, the intermediate segments 12 are situated at a higher level than the drinking segments 11, in such a way that the vertical distance H12 between the intermediate segments 12 and the floor V is sufficient for the birds in question to pass through unhindered underneath the intermediate segments 12. Said vertical distance H12 will also be indicated below by the term "passage height".

The vertical distance between a drinking segment 11 and an intermediate segment 12 is always bridged by a segment which will be indicated below by the term "connecting segment" 13. The length of the connecting segments 13 corresponds substantially to the difference H12–H11, and will also be indicated as H13 below; this measurement is adapted in practice to the type of birds for which the system in question is intended.

The system 1 thus provides drinking comfort for the birds: they can drink from a cup in a natural way with several others, while they can still pass through virtually unhindered between the drinking cups.

The system 1 is also hygienic. The use of drinking cups means that the spillage of water is minimal. Owing to the fact that said drinking cups are fitted directly on top of the continuous main line, and there are therefore no dead-ending branches, there are no zones with stagnant water during use, and the entire water content of the system can easily be refreshed by flushing.

In FIG. 1 the clear headroom above the drinking cups 20 is indicated by the letter H. Said clear headroom H corresponds to the vertical distance between the drinking cups 20 and the bearing rail 2, and depends, inter alia, on the length H13 of the connecting segments 13 and the length of the mounting brackets 5. The clear headroom H is also adapted in practice to the type of birds for which the distribution system concerned is intended. The clear headroom H must not be too small, otherwise the birds are hindered during drinking. The clear headroom H must not, however, be too great, otherwise the birds can tend to perch on the drinking cups.

The main line 10 with the pipe segments situated at differing heights can be configured in various ways. For example, it is possible for the drinking segments 11, the intermediate segments 12 and the connecting segments 13 to be straight pipe sections which are connected to each other at an angle at their respective ends. It is, however, preferable for said segments to merge by way of a smooth line into each other. For this purpose, the segments can be bent over at their ends. It is also possible for the drinking segments 11, the intermediate segments 12 and the connecting segments 13 to be straight pipe sections which are connected to each other by way of curved bend segments.

In a special embodiment, the drinking segment 11 has a U-shaped contour, or the drinking segment 11 is in the form of a semicircular bend segment.

It is also possible for the abovementioned segments of the main line 10 to be produced as individual segments and then attached to each other, for example by means of adhesives. However, such a production method is quite expensive. The abovementioned segments of the main line 10 are therefore preferably produced as an integral unit by bending a continuous straight pipe in the desired way.

In this process the starting point can be a straight length of pipe of a relatively great length, for forming a section of the main line comprising several successive segments 11, 12, 13. For the production of a main line having the desired length, which is dependent upon the location of use and can comprise many tens of meters, several of such sections are then connected to each other. Such a section then preferably comprises at least one drinking segment 11, two connecting segments 13 connecting to it, and two half intermediate segments 12. However, more preferably, such a section then comprises several drinking segments, for example two to six, including the intermediate segments and connecting segments lying between them, ending in two half intermediate segments.

As illustrated in FIG. 1, the connecting segments 13 can be directed vertically. Within the scope of the invention, that is not essential, because slanting connecting segments 13 between the drinking segments 11 and the intermediate segments 12 will also lead to a water distribution system which achieves the objectives according to the present invention, and connecting segments 13 placed in a slanting manner can provide the advantage that reduced resistance is encountered during the flushing of the main line. Moreover, in connection with the production process, it may be simpler if the connecting segments 13 are not directed precisely vertically. However, if the connecting segments 13 are directed substantially vertically, the clear passage length L between two successive drinking cups 20 is as great as possible.

The horizontal dimension of the drinking cups 20 can be selected according to the type of birds for which the water distribution system is intended. FIG. 1 shows that the horizontal distance between two successive, substantially vertically directed connecting segments 13, indicated by W, corresponds to the width of the drinking cups 20, so that as much as possible of the space between the successive drinking cups 20 is available to the birds as clear space for them to pass through.

The number of drinking cups per linear meter can in principle be freely selected; in an embodiment which has been found suitable, four drinking cups for every three meter of horizontal length are present, but this measurement can be greater or smaller as desired.

Figure 2A:
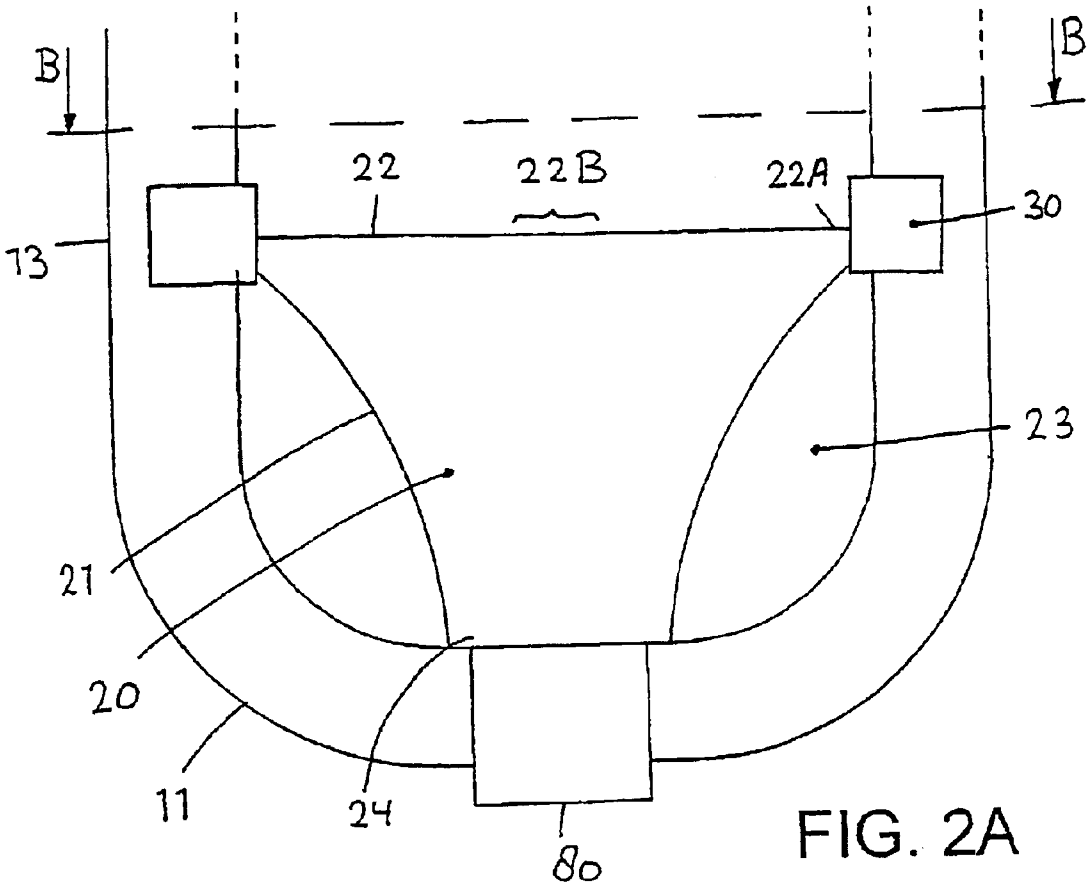
FIG. 2A shows on a larger scale a diagrammatic side view of an embodiment of a drinking cup.
Figure 2B:
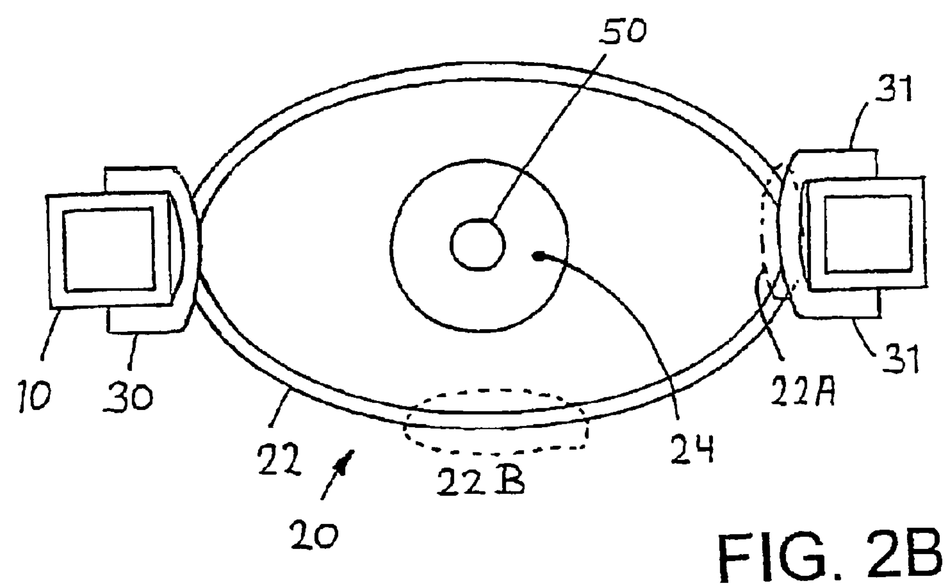
FIG. 2B shows a view from above along the line B—B in FIG. 2A.
Figure 2C:
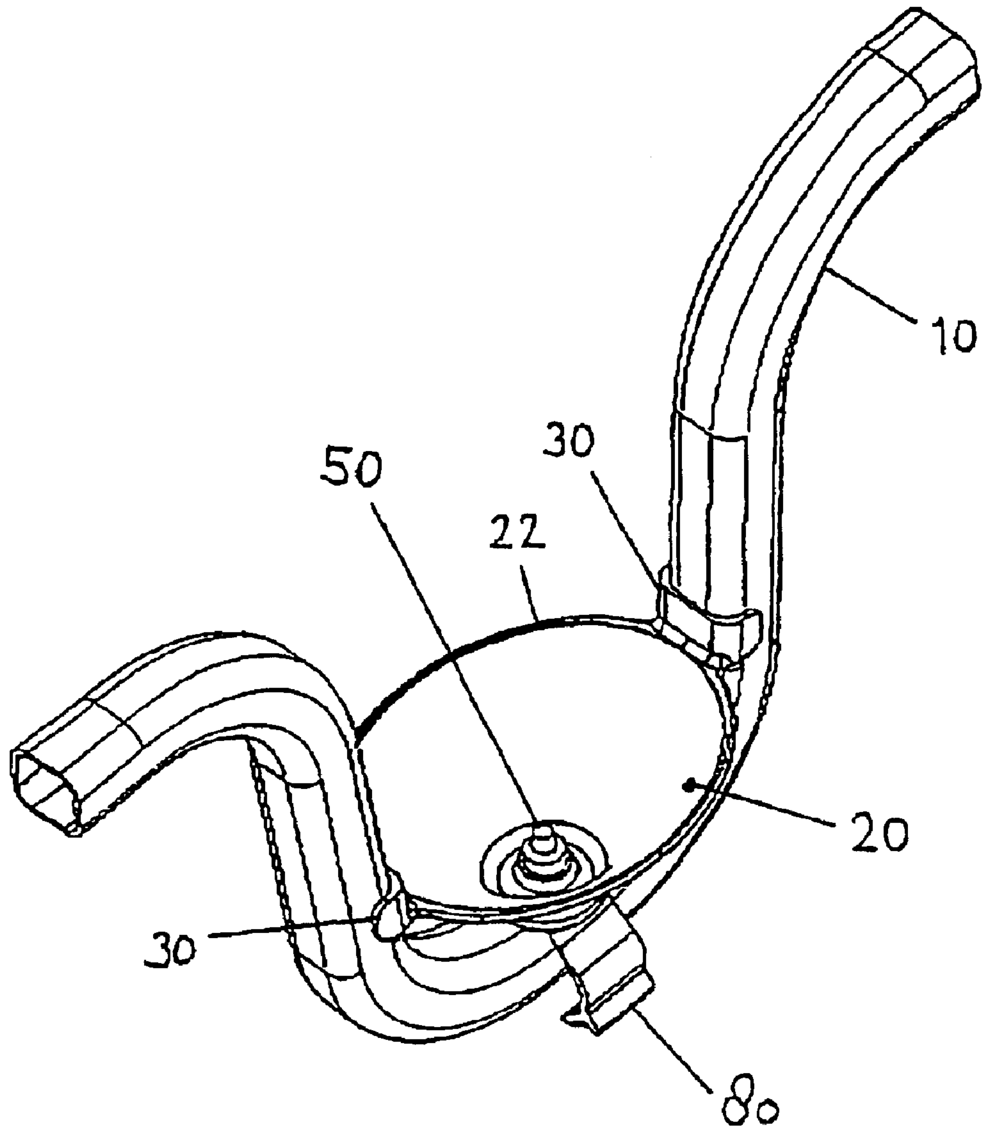
FIG. 2C shows a more detailed perspective drawing of this embodiment of a drinking cup.

FIG. 2C shows a perspective drawing of an embodiment of a drinking cup 20; FIG. 2A shows a side view of this embodiment of a drinking cup 20, and FIG. 2B shows a view of said drinking cup 20 from above, in the form of a cross section along the line B—B in FIG. 2A. It can be seen in FIG. 2A that the drinking segment 11 of the main line 10 can not only be in the form of a pipe segment curved in a semicircular shape, but that its central part, i.e. the bottom part of the drinking segment 11, can contain a horizontal segment part. It can be seen in FIG. 2B that the main line 10 in this embodiment is in the form of a pipe with a square contour; said pipe can, however, also be round, or it can have a different contour.

The drinking cups 20 comprise a bottom 24, a funnel-shaped wall 21 and a top edge 22. The funnel-shaped wall 21 of the drinking cups 20 can be in the form of a conical segment, i.e. a flat wall. However, the wall 21 of the drinking cup 20 is preferably curved in a trumpet shape or chalice shape, as shown. Two effects are achieved by this. On the one hand, the space between the drinking cup 20 and the drinking segment 11, indicated in FIG. 2A by the reference numeral 23, becomes greater than would be the case if the drinking cup 20 had a straight wall 21, so that said space 23 is easier to clean. Feed residues and litter are then also less likely to collect here.

On the other hand, the curved shape of the wall 21 ensures a better guidance of the beak of a bird from the edge 22 to the center of the bottom 24 of the drinking cup. Situated at said bottom 24, as will be explained in greater detail, is a valve 50, shown diagrammatically in FIG. 2B, through which water from the interior of the pipe 10 can flow to the drinking cup 20 if the valve 50 is touched. Normally, there will be adequate water in the drinking cup 20, and this water will be drunk by the birds from the cup. As the level of the water in the drinking cup 20 falls, the birds will also have to put their beaks further into drinking cup 20. When they then touch the abovementioned valve 50 with their beak, water flows again into the drinking cup 20, and the level of the water in the drinking cup rises again.

The top edge 22 of the drinking cup 20 in principle can be of any desired shape, for example a circular shape. Known drinking cups according to the prior art have a circular contour. However, it is preferable, as shown in FIGS. 2B—C, for the top edge 22 of the drinking cup 20 to be of an elongated shape, preferably an elongated round shape. The shape of the edge 22 can be described as an oval shape or elliptical shape. It is also possible for the edge 22 of the drinking cup 20 to have a rectangular contour, in which the corner regions are rounded.

The advantage achieved by the elongated contour of the top edge 22 of the drinking cup 20 is that the surface enclosed by said top edge 22 is relatively small, while the length of said edge 22 is relatively great. Said surface is one of the factors influencing the quantity of feed residues, litter and dust that will collect in the drinking cups: as said surface decreases, less feed residue, litter and dust will drift down into the drinking cups. Said length is representative of the number of birds that can drink comfortably out of a drinking cup: as said length increases, the drinking cup can serve more birds. This applies in particular to that part (22B) of the edge 22 extending between two connecting segments 13 of the main line 10, because that will be the point where birds approach the drinking cup 20 most frequently. During drinking, the birds will also peck away any feed residue and litter present in a drinking cup, which in fact means that the speed at which feed residue and litter is removed from the drinking cups can be greater as said length increases. In this way a drinking cup which according to the present invention is of an elongated shape provides an improved balance between the collection of feed residue, litter and dust in the drinking cup, on the one hand, and the birds pecking it away easily, on the other hand. By optimizing said shape according to the present invention, the accumulation of feed residue, litter and dust in a drinking cup is minimized.

In the view from above in FIG. 2B it can be seen that the bottom 24 of the drinking cup 20 can be of a circular shape, but the bottom 24 can also be of an elongated shape, corresponding to the elongated shape of the top edge 22, if desired.

A drinking cup 20 therefore preferably has differing transverse dimensions, measured in mutually perpendicular directions. In the views of FIGS. 2B and 2C the longitudinal direction of the drinking cup 20 is shown as running parallel to the longitudinal direction of the drinking segment 11. However, it is also possible for the longitudinal axis of the shape of the drinking cup to run perpendicular to the longitudinal direction of the drinking segment 11 at the position of the bottom of the drinking cup 20.

In principle, it is sufficient if the drinking cup 20 is fixed at its bottom 24 to the drinking segment 11. However, it is preferable, as shown in FIGS. 2A and 2B, for the drinking cup 20 also to be fixed to the main line 10 at its top edge 22. For this purpose, the drinking cup 20 is provided with two fixing members 30, fixed on or moulded onto the top edge 22 in a position opposite each other. In the embodiment shown, said fixing members 30 are in the form of substantially U-shaped brackets with legs 31 directed horizontally outwards. The distance between the two legs 31 of each U-shaped bracket 30 corresponds to the width of the main line 10. When the drinking cup 20 is being placed in position, said drinking cup is first pushed with a horizontal movement underneath the bearing rail 2, at a position above the drinking segment 11, and the drinking cup 20 is then moved with a vertical movement between the connecting segments 13, in the direction of the drinking segment 11. During this process, the U-shaped mounting brackets 30 will automatically grip around the connecting segments 13.

If desired, it is possible to fix the brackets 30 to the connecting segments 13, for example by means of screws, but this is not necessary.

The presence of said brackets 30 ensures that the drinking cups 20 are positioned more sturdily on the drinking segments 11, so that they are even more resistant to rough treatment, which they can receive from, for example, turkeys. In addition, the stability of the system as a whole is increased, because the drinking cups 20 have, as it were, produced a triangular connection between the connecting segments 13 and the drinking segment 11.

Figure 3A:
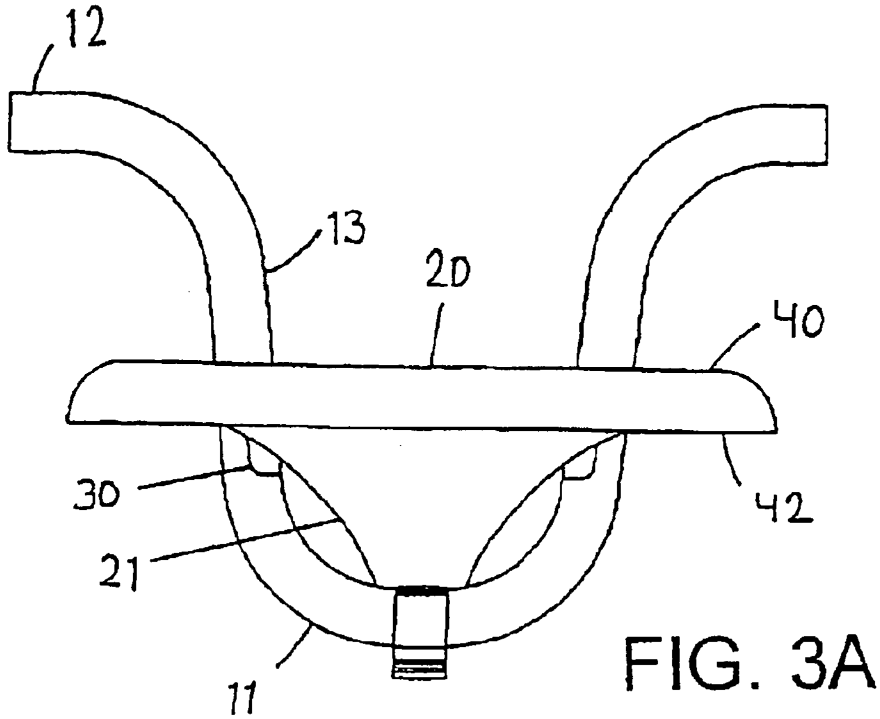
FIGS. 3A–3C show a side view, a view from above and a perspective drawing respectively of an embodiment of the drinking cup provided with an anti-spill surface, together with a part of a main line.
Figure 3B:
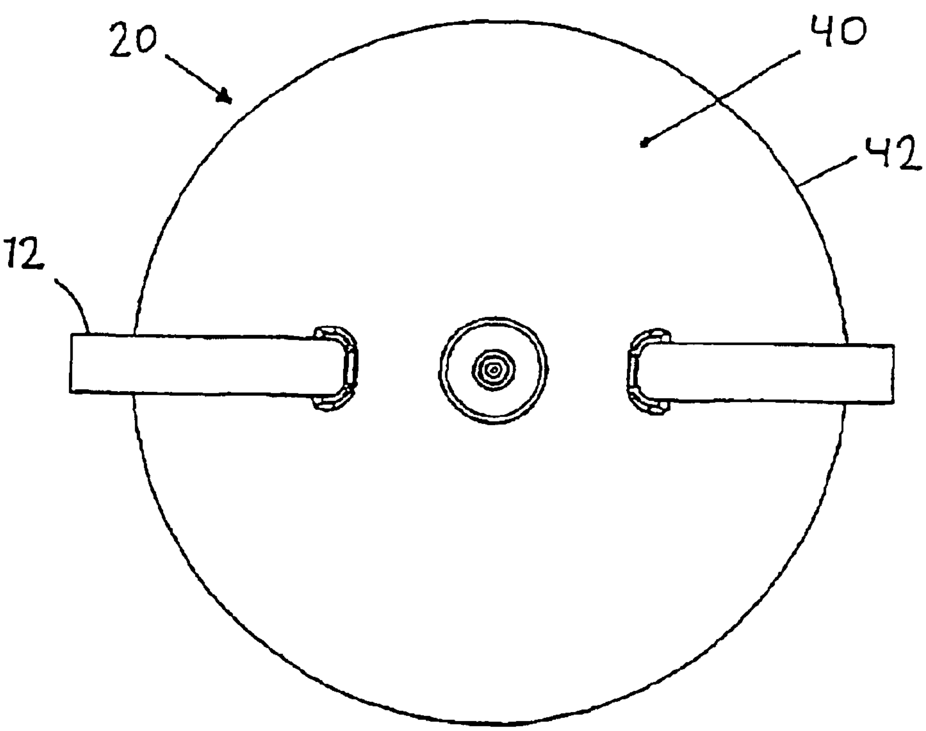
Figure 3C:
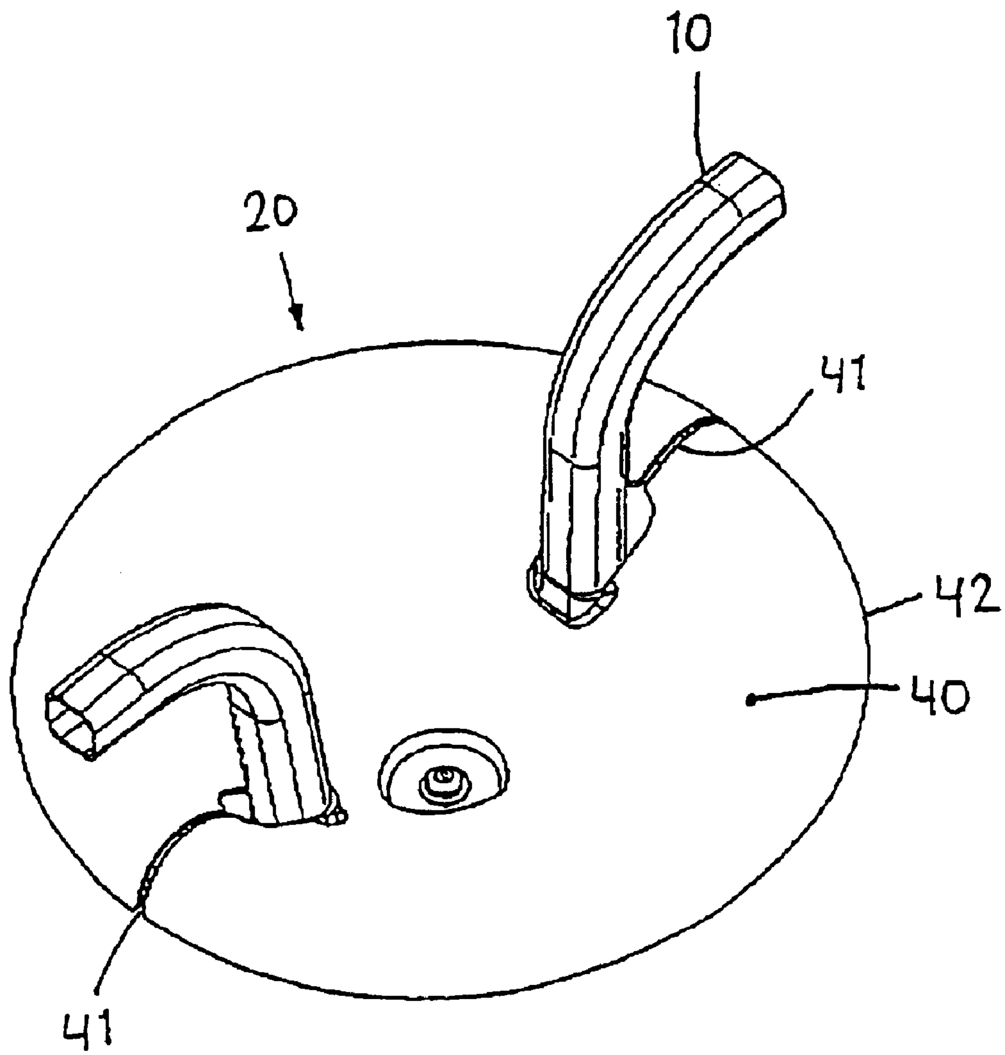

The drinking cup 20 illustrated in FIGS. 2A–C has such dimensions that the top edge 22 fits inside the connecting segments 13. Certainly in the case of birds like turkeys, it may be desirable to provide the drinking cups with a larger edge, in order to prevent spilling. FIGS. 3A–C show such an enlarged embodiment of the drinking cup 20. In fact, the central part of said larger drinking cup corresponds to the smaller drinking cup, but in this case the wall 21 of the drinking cup 20 extends further outwards and merges into an anti-spill surface 40, which is provided with two incisions 41, in order to allow through the connecting segments 13. In this case it is the anti-spill surface 40 that grips around the connecting segments 13, so that the brackets 30 discussed above may be omitted, but said brackets may also still be present, and in that case are preferably situated on the underside of the drinking cup, as shown clearly in FIG. 3A.

The incisions 41 may be equal in width over their entire length to the width of the connecting segments 13 of the main line 10, but that is not essential. It can be seen in FIG. 3C that said incisions 41 can be quite narrow near the outside edge 42 of the anti-spill surface 40, and at a distance from the outside edge 42 then merge into a wider part that fits around a connecting segment 13. During the positioning of the drinking cup 20, the material of the anti-spill surface 40 will then deform in order to allow through the main line 10, for which purpose the drinking cup, or at any rate its anti-spill surface 40, is advantageously made of a relatively thin and flexible material.

Figure 4:
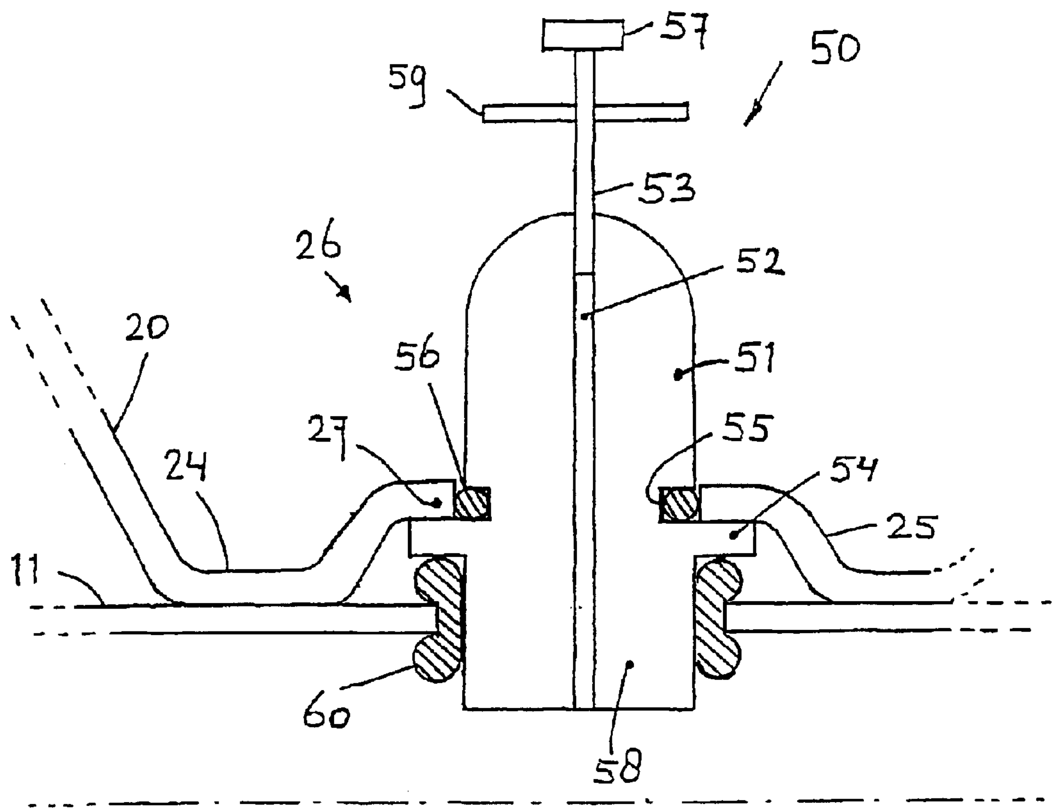
FIG. 4 shows a cross section of a drinking cup with a drinking valve.

FIG. 4 shows a cross section through the drinking valve 50 with a part of the drinking cup 20. The drinking valve 50 has a substantially cylindrical member 51, which has an axially directed water channel 52 extending through the member 51, which water channel is shut off at the top end by a valve body designed in such a way that it normally shuts off the water channel 52, even at a high water pressure, and the valve body opens the water channel 52 only when the valve body is moved by an external force. Since such valve bodies are known per se, their interior construction will not be described in any further detail here.

It can be seen in FIG. 4 that the valve body comprises a substantially axial stem 53, which extends into the water channel 52 and at its free end is provided with a flange 57. Under the flange 57 a disc 59, also indicated as a deflector, is fitted around the stem 53, which disc may or may not be freely movable along the stem 53. This design of the valve body of the drinking valve 50, in conjunction with a relatively high water pressure in the main line 10, produces a self-regulating effect and a desired low water level in the drinking cup.

When a bird touches the end of the stem 53 with its beak, and the water channel 52 is opened, a small jet of water is forced out of the water channel 52 with fairly great force, on account of the fairly high pressure in the line 10. As a reaction to the jet of water gushing out of the channel 52, the bird concerned immediately draws back its beak again, so that the total quantity of water coming out is small. In this way a relatively short pulse of water with relatively high energy comes out of the water channel 52, touches the underside of the deflector 59 and is thereby deflected to the side and downwards. This creates a vortex in the water in the drinking cup, with the result that any feed residue or litter present in the drinking cup does not have the opportunity to settle on the bottom, but remains, as it were, suspended in the water, so that the feed residue or litter can be pecked away by the drinking birds.

In addition, the water level in the drinking cup remains low, because the water pulse lasts only a short time. This is advantageous, on the one hand, because the number of microorganisms that can arise in the water will now be minimal. On the other hand, it is advantageous because the birds will now knock relatively frequently against the stem 53, and vortexes will therefore be created relatively frequently in the water, which promotes the self-cleaning effect.

The drinking valve 50 is self-supporting and is fixed in a sealing manner on a drinking segment 11 of the main line 10, the water channel 52 being in communication with the interior of the main line 10. For this purpose, the drinking valve can be, for example, screwed down in the drinking segment 11. In the embodiment shown, the bottom part 58 of the cylindrical member 51 is clamped in an annular sealing member 60 in a bore in the top wall of the drinking segment 11, which annular sealing member 60 provides a seal between the abovementioned member part 58 and the top wall of the drinking segment. The material of the annular sealing member 60 can be rubber or another suitable material. The clamping force is sufficient to retain the drinking valve 50, in such a way that a certain water pressure inside the main line 10 can be resisted.

On its outside surface the cylindrical member 51 has a fixing flange 54, at a distance from its bottom end. The external diameter of the fixing flange 54 is greater than the diameter of the annular sealing member 60. During normal use, the fixing flange 54 presses on the annular sealing member 60.

The bottom 24 of the drinking cup 20 has a central elevation 25, containing a central passage aperture 26, the diameter of which is smaller than the diameter of the flange 54 of the drinking valve 50. The drinking cup 20 is placed over the drinking valve 50 on the line 10, the cylindrical member 51 extending through the central passage aperture 26 in the bottom 24 of the drinking cup 20, and the edge 27 of said central passage aperture 26 resting upon the top edge of the flange 54.

When the drinking cup 20 is now fixed on the line 10, in such a way that the edge 27 of said central passage aperture 26 presses on the top edge of the flange 54, said flange 54 in turn presses on the annular sealing member 60, with the result that an even better water seal is ensured.

The edge 27 of the central passage aperture 26 can fit tightly around the member 51 of the drinking valve 50 and provide a seal on the top surface of the flange 54. However, a peripheral groove 55 is preferably provided in the member 51, just above the flange 54, in which groove a sealing ring 56, such as, for example, a rubber O-ring 56 or the like is placed, the external diameter of which ring is greater than the external diameter of the member 51. The central passage aperture 26 in this case has a diameter that is greater than the external diameter of the member 51, but smaller than the external diameter of said sealing ring 56. This means that no great demands are made of the production tolerances of the drinking cup 20 and the drinking valve 50, while an effective water seal is still achieved.

Figure 4B:
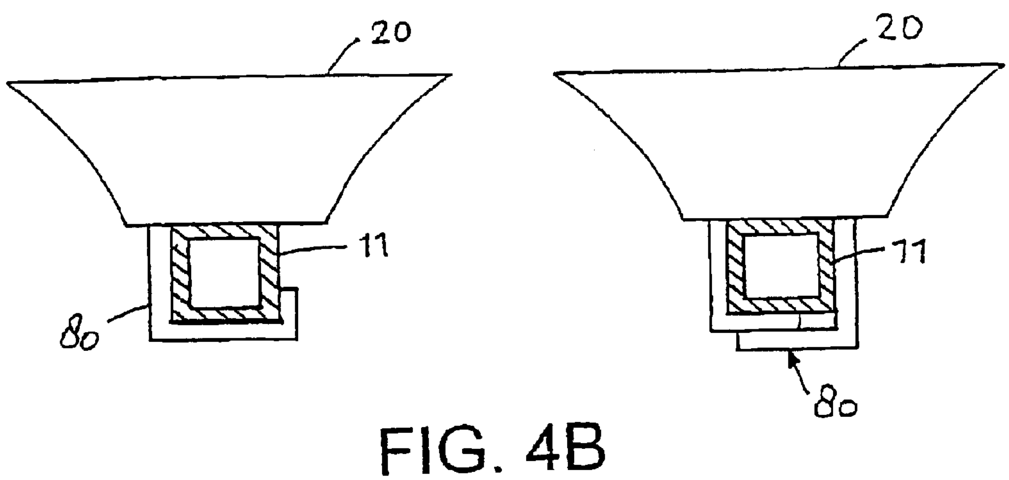
FIG. 4B illustrates variants of a detail of the fastening of a drinking cup to a line.

The fixing of the drinking cup 20 on the drinking segment 11 can be carried out in an advantageous manner by means of a fixing bracket 80, preferably a quick-acting bracket, fitted on the bottom 24 of the drinking cup 20 and gripping around the drinking segment 11. FIG. 4B illustrates two possible variants of this. Since other fixing means are also possible, this aspect will not be described any further here.

Owing to these design details, positioning of the drinking cups is extremely simple to achieve, but the removal or replacement of drinking cups is also extremely simple to achieve, if necessary. The drinking cup can be simply removed upwards by releasing the abovementioned bracket or releasing the optional other fixing means. The drinking valve 50 concerned can, however, remain in position, clamped in a sealing manner in the main line 10, so that it is not necessary to remove the pressure of the water system, and thus in fact put the system out of operation. This makes it possible to remove individual drinking cups, for example for cleaning or repair, without the system having to be put out of operation.

In this way the improved water distribution system according to the present invention is of a modular construction, by which is meant that the drinking cups are fitted in an exchangeable manner and can be replaced individually by another specimen, with different features or otherwise, without it being necessary to shut off the water line, and thus put the system out of operation. More particularly, each individual drinking cup can be replaced by, for example, a drinking cup with a different cup width and/or different cup height, while the valve remains in the line and the water remains sealed off.

The present invention thus provides a water distribution system 1 with a continuous main line 10. Drinking cups 20 are placed on drinking segments 11 of the main line 10. Between the drinking segments 11, the main line 10 has intermediate segments 13, which are situated at a higher level than the drinking segments 11. The drinking cups are situated at a level suitable for drinking, and the intermediate segments are situated at a level that is suitable for allowing the birds to pass through unhindered underneath them. The full line system can be cleaned by flushing, and has no dead-end branches. The top edges 22 of the drinking cups 20 are advantageously fixed to vertically directed line segments.

The water distribution system 1 is modular. The drinking cups 20 are fitted in an exchangeable manner and can be replaced individually with another specimen, with different features or otherwise, without it being necessary to shut off the water line, and thus put the system out of operation.

It will be clear to a person skilled in the art that the scope of the present invention is not restricted to the examples discussed above, but that various changes and modifications of it are possible without departing from the scope of the invention as defined in the appended claims. For example, it is possible for several drinking cups to be placed on a drinking segment 11.

What is claimed is:

1. Water distribution system, comprising:

a continuous main line and a plurality of drinking cups placed on a top side of said main line;

wherein a drinking cup is always placed on a top side of a drinking segment of said main line;

successive drinking segments always being connected in series to each other by way of intermediate segments of said main line; and said intermediate segments being situated at a higher level than said plurality of drinking cups to allow poultry to pass thereunder.

2. Water distribution system according to claim 1, in which all of said drinking segments are situated substantially at a same lower level, and in which all of said intermediate segments are situated substantially at a same higher level.

3. Water distribution system according to claim 1, in which a single one of said drinking cups is placed on each of said drinking segments.

4. Water distribution system according to claim 1, in which said drinking segments have a substantially U-shaped contour, or are designed as a semicircular bend segment.

5. Water distribution system according to claim 1, in which said drinking cup is placed on a substantially horizontal segment part of said drinking segment concerned.

6. Water distribution system according to claim 1, in which said intermediate segments are directed substantially horizontally.

7. Water distribution system according to claim 1, in which said drinking segments and said intermediate segments are connected to each other by means of connecting segments, which are preferably directed vertically.

8. Water distribution system according to claim 1, in which said drinking cups are connected to said main line at a top edge.

9. Water distribution system according to claim 1, in which a section of said main line, comprising a plurality of successive of said drinking segments, intermediate segments and any connecting segments present, is formed from a single pipe, preferably by bending a straight pipe in a suitable manner.

10. Water distribution system according to claim 1, in which a longitudinal direction of an elongated shape of a top edge of said drinking cup is directed parallel to said corresponding drinking segment.

11. Water distribution system according to claim 1, in which said drinking cups are fitted in an exchangeable manner, so that said system is modular.

12. Water distribution system according to claim 11, in which a drinking valve is associated with the drinking cup, which drinking valve has a body that is retained in a sealing manner on a top wall of said drinking segment;

in which said drinking cup comprises a bottom which is provided with a central passage aperture;

in which said body of drinking valve extends through said central passage aperture in said bottom of said drinking cup;

in which an edge of said central passage aperture connects in a sealing manner to said drinking valve; and in which a fixing flange is formed on an outer surface of said body of said drinking valve;

wherein said central passage aperture is fitted in a central elevation of said bottom of said drinking cup;

said edge of said central passage aperture lying on said fixing flange.

13. Water distribution system according to claim 12, in which said drinking valve is provided with a peripheral groove, in which an annular sealing member is placed; and in which said edge of said central passage aperture rests against said annular sealing member.

14. Water distribution system according to claim 1, in which said drinking cup is fixed on said drinking segment by means of a fixing bracket, preferably a quick-acting bracket, fitted on a bottom of said drinking cup and gripping around said drinking segment.

* * * * *